United States Patent [19]
Watanabe et al.

[11] Patent Number: 5,299,033
[45] Date of Patent: Mar. 29, 1994

[54] IMAGE READING AND RECORDING APPARATUS WITH MARKING BOARD AND MOVEABLE SCANNING ARM CONVEYED BY A CABLE AND DRUM ARRANGEMENT

[75] Inventors: Toshio Watanabe, Fujisawa; Yuuichi Abe, Niimi; Hiroto Morikawa, Niimi; Hiroshi Takimoto, Niimi, all of Japan

[73] Assignee: Matsushita Graphic Communication Systems, Inc., Tokyo, Japan

[21] Appl. No.: 877,515

[22] Filed: May 1, 1992

[30] Foreign Application Priority Data

May 7, 1991 [JP] Japan .................................. 3-101302
May 24, 1991 [JP] Japan .................................. 3-119843

[51] Int. Cl.⁵ ..................... H04N 1/10; H04N 1/23; H04N 1/393; B66D 1/00; B66D 1/12
[52] U.S. Cl. ................................. 358/497; 358/451; 358/296; 254/266; 254/329; 254/362
[58] Field of Search .................. 358/296, 451, 497; 346/76 PH; 74/506; 254/266, 268, 362, 329

[56] References Cited

U.S. PATENT DOCUMENTS 4,501,931 2/1985 Ohya et al. .
4,587,568 5/1986 Takayama et al. .
4,725,889 2/1988 Yaniv et al. ......................... 358/451
5,090,666 2/1992 May ..................................... 254/329

FOREIGN PATENT DOCUMENTS 62-185453 8/1987 Japan .
63-194998 8/1988 Japan .
63-276360 11/1988 Japan .

Primary Examiner—Edward L. Coles, Sr.
Assistant Examiner—Scott A. Rogers
Attorney, Agent, or Firm—Lowe, Price, LeBlanc & Becker

[57] ABSTRACT

An image reading and recording apparatus such as an electronic blackboard includes a reading unit movable along a guide rail for reading information written on a board, a drive motor integral with the reading unit and operative to move the reading unit relative to the board, and a power transmission mechanism for transmitting a driving force of the drive motor to the reading unit so as to move the reading unit relatively to the board. The power transmission mechanism is composed of a pulley fixed to a drive shaft of the motor and a wire rope extending along the guide rail in a stretched condition and wound around the pulley by one turn. Upon rotation of the motor, the pulley rolls on and along the wire rope, thereby moving the reading unit relative to the board. Due to a large contact area provided between the pulley and the wire rope, the movement of the reading unit is highly reliable and hence the information on the board can be read with high accuracy. The apparatus also includes an image recording unit which is so constructed as to prevent accidental separation of a recording paper from a recording head, thereby ensuring a high quality printing of the information on the recording paper.

6 Claims, 5 Drawing Sheets

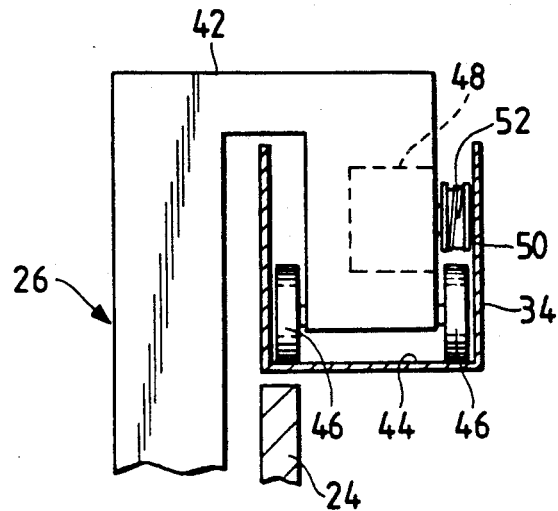
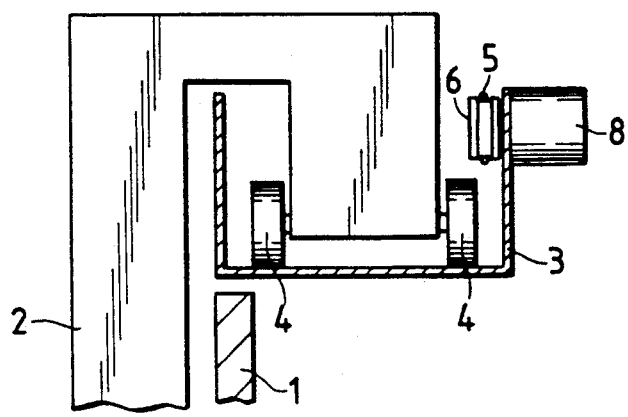

IMAGE READING AND RECORDING APPARATUS WITH MARKING BOARD AND MOVEABLE SCANNING ARM CONVEYED BY A CABLE AND DRUM ARRANGEMENT

BACKGROUND OF THE INVENTION

1. Field of the Invention

The present invention relates to an image reading and recording apparatus, such as an electronic blackboard, a facsimile machine etc., for optically reading information written on a board or a flexible sheet and regenerating the information in the form of a hard copy. The invention is also concerned with an image recording unit for used in the image reading and recording apparatus.

2. Description of the Prior Art

A known electronic blackboard includes, as shown in FIGS. 5 and 6, a board 1 for receiving information written thereon, a reading unit 2 movable along the board 1 for reading the information on the board, a guide rail 3 for movably supporting the reading unit 2, a pair of wheels 4 and 4 (FIG. 6) attached to the reading unit 2 for rolling movement along the guide rail 3, an endless wire rope 5 extending along the guide rail 3, a pair of pulleys 6 and 7 around which the wire rope 5 is trained, a motor 8 attached to the guide rail 3 for driving the pulley 6. The reading unit 2 is firmly connected to a portion of the wire rope 5 so that when the wire rope 5 is moved around the pulleys 6 and 7, the reading unit 2 moves along a surface of the board 1 to read information written thereon.

According to another known electronic blackboard, such as shown in Japanese Patent Laid-open Publication Nos. 62-185453, 63-194998 and 63-276360, the drive motor is attached to the reading unit instead of the guide rail. The drive motor rotates a drive roller which is held in friction contact with a guide rail. Thus, upon rotation of the drive roller, the drive roller rolls along the guide rail to move the reading unit along the guide rail during which time information written on a board is read by the reading unit.

Both of the foregoing known electronic blackboards are, however, not satisfactory due to the drawbacks described below.

In the first-mentioned known electronic blackboard using the wire rope such as shown in FIGS. 5 and 6, the pair of pulleys 6 and 7 and the drive motor 8 must be disposed outside the range of movement of the reading unit 2 and, therefore, a long guide rail 3 is needed. In addition, the drive motor 8 is disposed behind the guide rail 3 so that the overall depth of the electronic blackboard is relatively large.

The second-mentioned known electronic blackboard is free from the foregoing problem because the drive motor and the drive roller are mounted on the reading unit. However, since a driving force tending to move the reading unit is given solely by a frictional force acting between the drive roller and the guide rail, the movement of the reading unit tends to become unstable due to slippage between the driving roller and the guide rail. As a result, the reading unit cannot read the information on the board with a sufficient degree of reliability and accuracy.

On the other hand, a conventional image recording unit which may be incorporated in an electronic blackboard or a facsimile machine includes, as shown in FIGS. 7 and 8, a recording head 9 for printing information on a recording paper 10 and a drive unit 11. The drive unit 11 is composed of a motor 12, an intermediate gear 13 meshing with a pinion 14 mounted on a drive shaft 12a of the motor 12, and a transmission gear 15 meshing with the intermediate gear 13. The recording head 9 and the drive unit 11 are mounted on a body (not shown) of the image recording unit. The image recording unit also includes a recording roller 16 for feeding the recording paper 10 while forcing the recording paper 10 against the recording head 9. The recording roller 16 has a driven gear 17 and is attached to a lid assembly (not shown) which is pivoted to the body of the image recording unit and movable between an open position and a closed position relative to the unit body. When the lid assembly is moved from the open position to the closed position, the driven gear 17 is brought into meshing engagement with the transmission gear 15 and, at the same time, the recording roller 16 forces the recording paper 10 against the recording head 9. Conversely, when the lid assembly is moved from the closed position to the open position, the recording roller 16 and the driven gear 17 move in the direction indicated by the arrow A shown in FIG. 8. The transmission gear 15 is disposed on the same side as the recording head 9 relative to the recording roller 16.

With this construction, when the motor 12 is driven to rotate transmission gear 15 in the direction of the arrow B, the driven gear 17 is rotated by the transmission gear 14 in the direction of the arrow C. In this instance, the driven gear 17 is subjected to a force tending to move the driven gear 16 and the recording roller 16 in the direction of the arrow A (FIG. 8), thereby urging the lid assembly toward its open position. The recording roller 16 is no longer possible to force the recording paper 10 reliably against the recording head 9. Under these circumstances, the printing quality is significantly deteriorated and sometimes the printing itself becomes impossible.

SUMMARY OF THE INVENTION

With the foregoing drawbacks of the prior art in view, it is an object of the present invention to provide an image reading and recording unit, such as an electronic blackboard, which is compact in size and reliable in operation and, hence, is able to read and record information on a board reliably with high accuracy.

Another object of this invention is to provide an image recording unit for use in such image reading and recording apparatus, which unit is so constructed as to prevent accidental separation of a recording paper from a recording head during operation of the image recording unit.

According to a first aspect of this invention, there is provided an image reading apparatus which comprises a board for receiving information written thereon, a guide rail extending along a side of the board, a reading unit movable along the guide rail for reading the information on the board, a drive motor integral with the reading unit and operative to move the reading unit relative to the board, and power transmission means for transmitting a driving force of the drive motor to the reading unit so as to move the reading unit and the board relatively to one another. Preferably, the power transmission means is a pulley fixedly mounted on a drive shaft of the drive motor, and a wire rope stretched along the guide rail and wound around the pulley by one turn.

According to a second aspect of this invention, there is provided an image recording unit, for use in an image reading and recording apparatus, for producing a hard copy of a picture signal received from an image reading unit of the image reading and recording apparatus, the image recording unit comprising a fixed unit body, a drive unit mounted on the unit body and including a motor and a transmission gear rotatably driven by the motor, a recording head mounted on the unit body, a closure assembly attached to the unit body and movable relative to the unit body between an open position remote from the body and a closed position united with the body, a recording roller mounted on the closure assembly and forcing a recording sheet against the recording head when the closure unit is disposed in the closed position, and a driven gear fixedly mounted on an end of the recording roller and releasable engaged with the transmission gear for rotating the recording roller when the closure assembly is disposed in the closed position, wherein the transmission gear is disposed in such a position that the driven roller is urged by the transmission gear in a direction as to force the recording roller against the recording head when the transmission gear is rotating. Preferably, the transmission gear is disposed on the opposite side of the recording head relative to the recording roller.

According to a third aspect of this invention, there is provided an image reading and recording apparatus which comprises a board for receiving information written thereon, a guide rail extending along one side of the board, a reading unit movable along the guide rail for reading the information on the board, and a recording unit for recording a picture signal received from the reading unit, the recording unit being capable of regenerating the information on a reduced scale as a hard copy of the picture signal. The image reading and recording apparatus may further includes a drive motor integral with the reading unit and operative to move the reading unit relative to the board, and power transmission means for transmitting a driving force of the drive motor to the reading unit so as to move the reading unit relative to the board. The power transmission means preferably is of the construction as specified above. It is preferable that the image recording unit is so constructed as specified above.

The above and other objects, features and advantages of the present invention will become more apparent from the following description when making reference to the detailed description and the accompanying sheets of drawings in which a preferred structural embodiment incorporating the principles of the present invention is shown by way of illustrative example.

BRIEF DESCRIPTION OF THE DRAWINGS

FIG. 2 is an enlarged fragmentary cross-sectional view taken along line the line II—II of FIG. 1;

FIG. 6, appearing with FIG. 2, is an enlarged cross-sectional view taken along line VI—VI of FIG. 5;

DETAILED DESCRIPTION OF THE INVENTION

Figure 1:
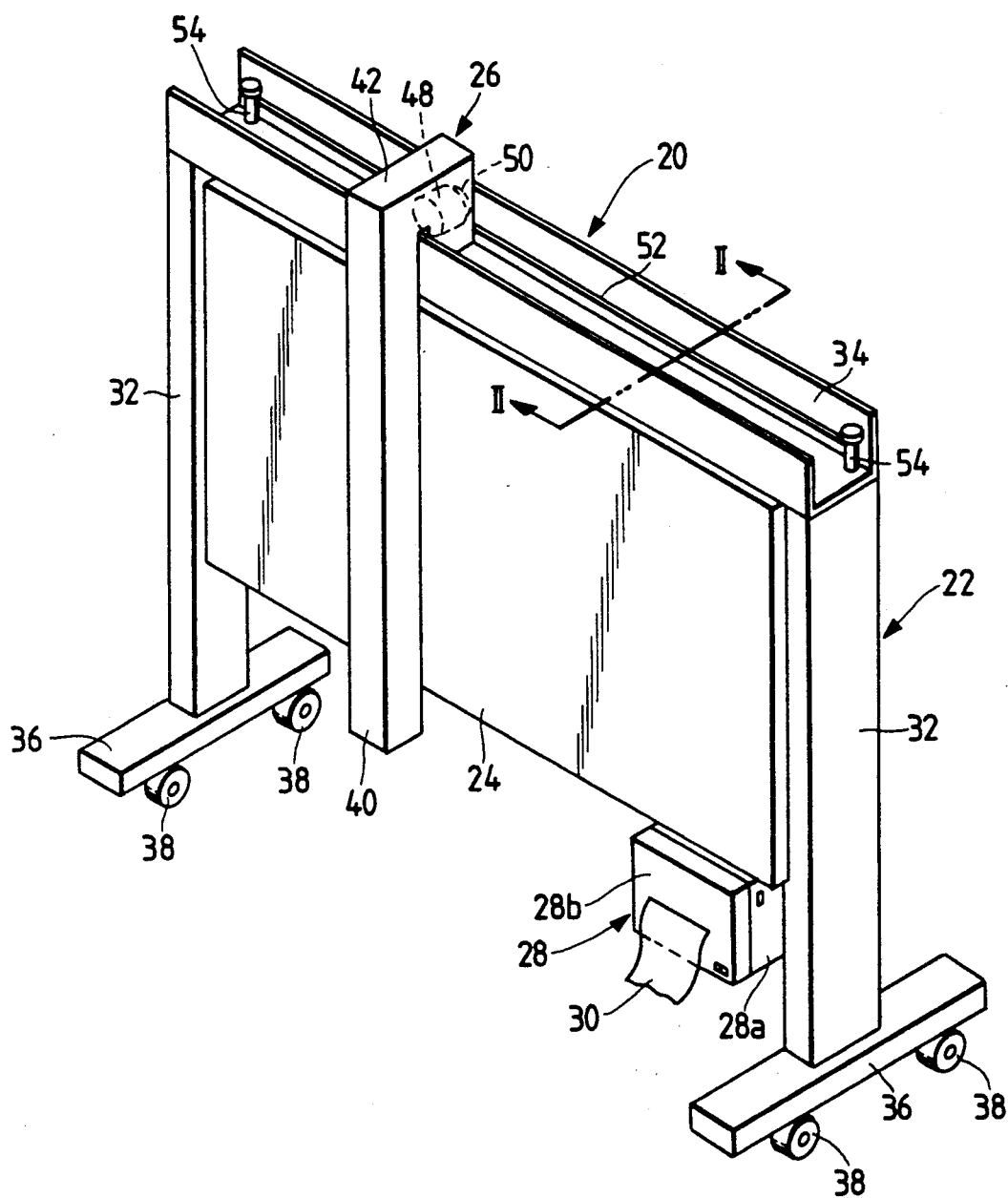
FIG. 1 is a perspective view of an electronic blackboard according to an embodiment of this invention.

FIG. 1 shows an image reading and recording apparatus according to an embodiment of the present invention. In the illustrated embodiment, the apparatus comprises an electronic blackboard 20

The electronic blackboard 20 generally comprises a movable frame 22, a board 24, such as a blackboard or a white board, vertically mounted on the frame 22 for receiving information written thereon in the form of characters, figures, drawings, etc., a reading unit 26 having a photosensor array (not shown) for optically reading the information on the board 24, and an image recording unit 28 for recording the information on a recording paper 30, in the form of a hard copy on a reduced scale, according to a picture signal received from the reading unit 26.

The movable frame 22 includes a pair of laterally spaced upright columns 32 and a horizontal guide rail 34 interconnecting the upright columns 32 at their upper ends. Each of the upright columns 32 has a horizontal leg 36 at a lower end thereof, and a pair of casters 38 connected to the under side of the leg 36 so that the frame 22 can be moved from one place to another. The guide rail 34 extends longitudinally long an upper horizontal edge of the board 24.

The reading unit 26 is movable along the guide rail 34 so as to read out the information on the board 24 by means of the non-illustrated photosensor array received in an elongate sensor portion 40 extending over and across a surface of the blackboard 24. As shown in FIG. 2, the reading unit 26 has a hook-shaped upper end 42 loosely received in a U-shaped groove 44 in the guide rail 34, and a pair of wheels 46, 46 attached to the upper end 42 and rollingly movable along a bottom wall of the guide rail 34. The reading unit 26 further includes a drive motor 48 mounted in the upper end 42, and a pulley 50 fixedly mounted on a rotating shaft of the drive motor 48.

As shown in FIG. 1, a wire rope 52 extends longitudinally along the guide rail 34 in a stretched condition, with its opposite ends fixed to a pair of support pins 54, 54 located slightly outside a region within which the reading unit 26 is movable. The wire rope 52 is wound around the pulley 50 by one turn, as shown in FIG. 2. The wire rope 52 and the pulley 50 serve as a power transmission means or mechanism for transmitting a driving force of the drive motor 48 to the reading unit 26 for moving the reading unit 26 relative to the board 24.

Figure 3:
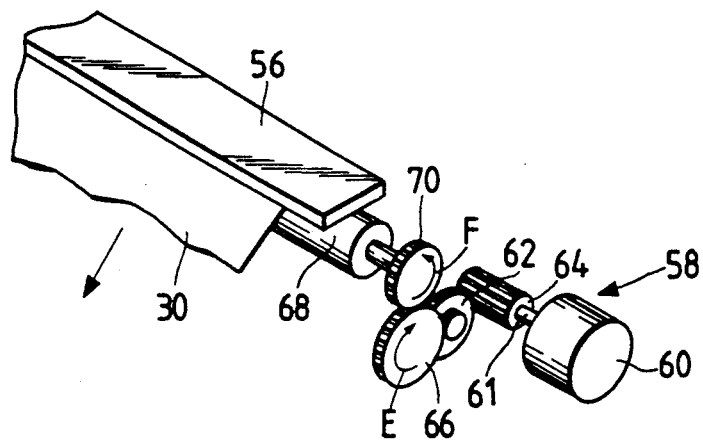
FIG. 3 is a perspective view of a main portion of an image recording unit incorporated in the electronic blackboard.
Figure 4:
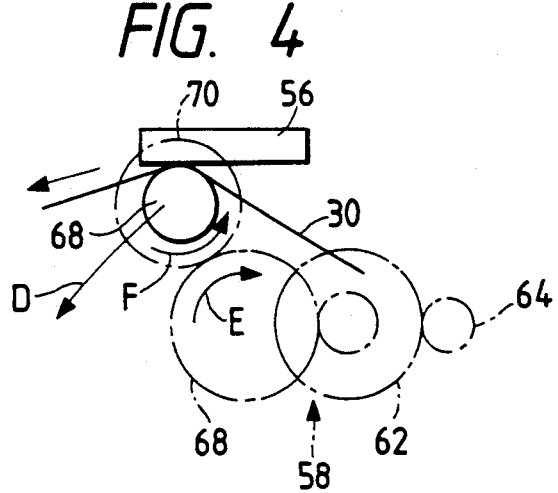
FIG. 4 is a diagrammatical side view of the image recording unit.
Figure 8:
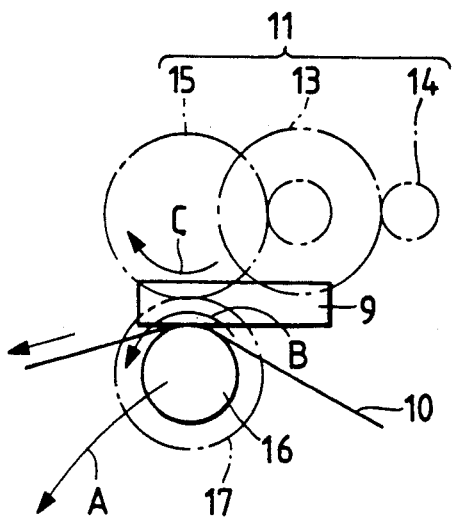
FIG. 8 is a diagrammatical side view of the image recording unit.

The image recording unit 28 of the electronic blackboard 20 includes, as shown in FIG. 3, a recording head 56 for printing information on a recording paper 30, and a drive unit 58 for feeding the recording paper 30 in synchronism with operation of the recording head 56. The recording head 56 comprises a thermal printing head. The drive unit 58 is composed of a motor 60, an intermediate gear 62 meshing with a pinion 64 fixed on a drive shaft 61 of the motor 60, and a transmission gear 66 meshing with the intermediate gear 62. The recording head 56 and the drive unit 58 are mounted on a body 28a (FIG. 1) of the image recording unit 28. The image recording unit 28 further includes a recording roller 68 for feeding the recording paper 30 while forcing the recording gear 30 against the recording head 56. The recording roller 68 has a driven gear 70 at one end thereof. The recording roller 68 is mounted on a closure assembly such as a lid 28b (FIG. 1) which is pivoted to the body 28a (FIG. 1) of the image recording unit 28 and movable between an open position remote from the unit body 28a and a closed position united with the unit body 28a. When the lid 28b is moved from the closed position to the open position, the recording roller 68 moves in the direction of the arrow D (FIG. 4). Conversely, when the lid 28b is moved from the open position to the closed position, the driven gear 70 is brought into meshing engagement with the transmission roller 66 and, at the same time, the recording roller 68 brings the recording paper 30 into pressure contact with the recording head 56. The transmission gear 66, as opposed to one 14 of the prior art shown in FIG. 8, is disposed on the opposite side of the recording head 56 relative to the recording roller 68. The transmission gear 66 is located at such a position that the driven gear 70 is able to smoothly move into and away from meshing engagement with the transmission gear 66 in response to closing and opening operations of the lid 28b.

The electronic blackboard 20 of the foregoing construction operates as follows.

When the electronic blackboard 20 is not used, the reading unit 26 is disposed at one end of the guide rail 34. When a start switch (not shown) is activated, the drive motor 48 is energized to rotate the pulley 50 in one direction. Upon rotation, the pulley 50 reels in the wire rope 52 from on side thereof while continuously withdrawing the wire rope 52 from the opposite side. Since the wire rope 52 is stretched between the support pins 54, the pulley 50 is caused to roll on and along the wire rope 52 extending longitudinally along the guide rail 34. With this movement of the pulley 50, the reading unit 26 moves along the guide rail 34 and the board 24 so that information written on the board 24 is optically read by means of the non-illustrated photosensor array received in the elongate sensor portion 40 of the reading unit 26.

Figure 5:
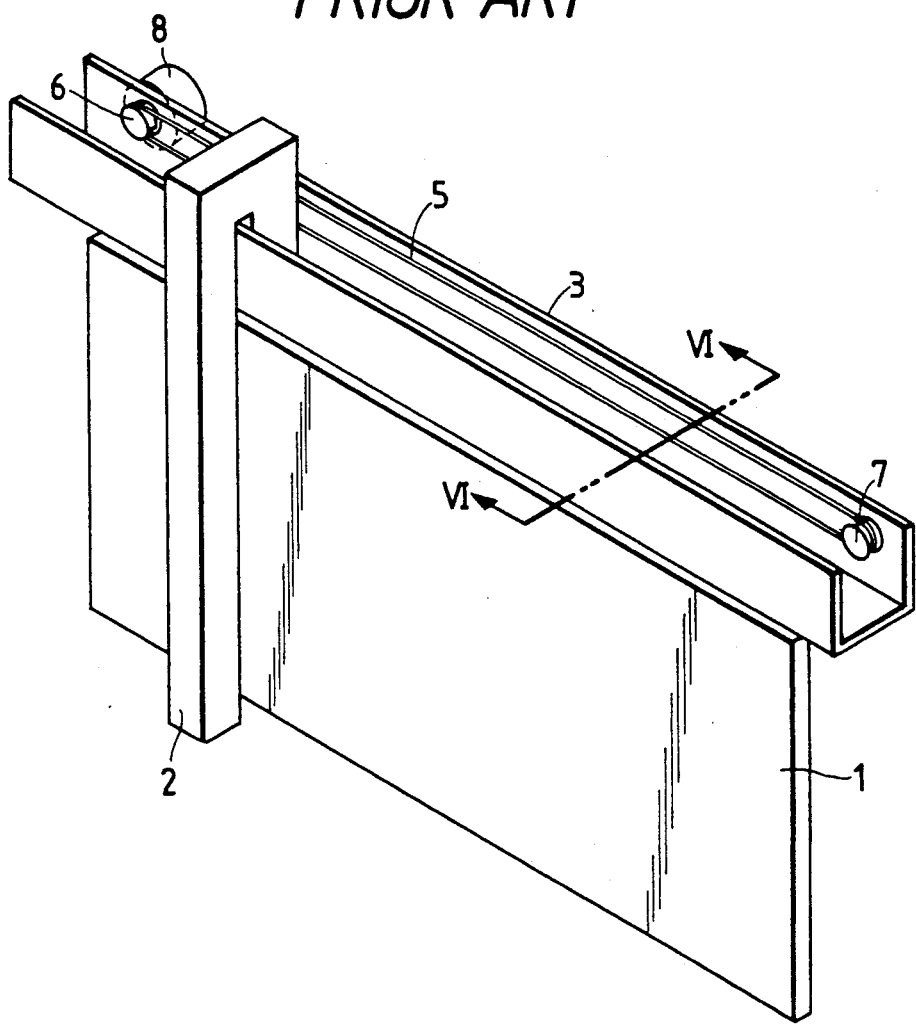
FIG. 5 is a perspective view of a main portion of a conventional electronic blackboard.
Figure 7:
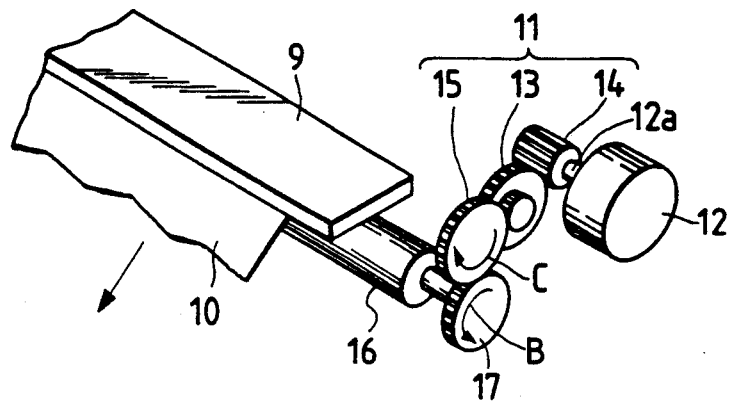
FIG. 7 is a perspective view of main portion of an image recording unit.

Since the wire rope 52 is wound around the pulley 50 by one turn, the contact length between the pulley 50 and the wire rope 52 is considerably longer than that of the prior art shown in FIG. 5 and 6. The pulley 50 moves along the wire rope 52 without slippage, so that the reading unit 26 is able to move toward a desired position with high accuracy in response to the rotation of the drive motor 48. In addition, since the wire rope 52 is merely stretched along the guide rail 34, the power transmission mechanism of the electronic blackboard 20 is extremely simple in construction as compared to that of the known blackboard shown in FIG. 5 and 6. The use of the stretched wire rope 52 dispenses with the need for a rather complicated conventional arrangement such as shown in FIGS. 5 and 6 in which the motor 8 and the pulley 7 are disposed on opposite ends of the guide rail 3. The guide rail 34 of this invention is shorter than the guide rail 3 of the convectional electronic blackboard. The electronic blackboard 20 of this invention is simple in construction and compact in size, and reliable in operation as compared to the conventional electronic blackboard.

The information read by the reading unit 26 can be regenerated or printed out on the recording paper 30 in the form of a hard copy by means of the image recording unit 28. When the lid 28b (FIG. 1) is closed, the recording roller 68 continuously forces the recording paper 30 against the recording head 56 and, at the same time, the driven gear 70 is held in meshing engagement with the transmission gear 66. In this condition, when the motor 60 (FIG. 3) is driven to rotate the transmission gear 66 in the direction of the arrow E, a rotary motion of the transmission gear 66 is transmitted to the driven gear 70, thereby rotating the driven gear 70 and the recording roller 68 in the direction of the arrow F. Thus, the recording paper 30 is fed forwardly. In synchronism with the advancing movement of the recording paper 30, the recording head 56 prints the information on the recording paper 30 according to a picture signal received from the reading unit 26. In this instance, since the transmission gear 66 is disposed below the driven gear 70 (namely, since the transmission gear 66 is disposed on the opposite side of the recording head 56 relative to the recording roller 68), as shown in FIG. 4, rotation of the transmission gear 66 produces a force tending to move the driven gear 70 upwardly, thereby forcing the recording roller 68 against the recording head 56. Since the direction of the force thus produced is the same as the closing direction of the lid 28b, the lid 28b (FIG. 1) is protected against accidental opening and, hence, the recording paper 30 is always kept in friction contact with the recording head 56 throughout the operation of the image recording unit 28. Thus, the printing operation can be performed reliably with high accuracy.

Obviously, various minor changes and modifications of the present invention are possible in the light of the above teaching. It is therefore to be understood that within the scope of the appended claims the invention may be practiced otherwise than as specifically described.

What is claimed is:

1. An image recording unit, for use in an image reading and recording apparatus, for producing a hard copy of a picture signal received from an image reading unit of the image reading and recording apparatus, said image recording unit comprising:

a fixed unit body;

a drive unit mounted on said unit body and including a motor and a transmission gear rotatably driven by said motor;

a recording head mounted on said unit body;

a closure assembly attached to said unit body and movable relative to said unit body between an open position remote from said body and a closed position united with said body;

a recording roller mounted on said closure assembly and forcing a recording sheet against said recording head when said closure unit is disposed in said closed position;

a driven gear fixedly mounted on an end of said recording roller and releasable engaged with said transmission gear for rotating said recording roller when said closure assembly is disposed in said closed position; and said transmission gear being disposed in such a position that said driven roller is urged by said transmission gear in a direction as to force said recording roller against said recording head when said transmission gear is rotating.

2. An image recording unit according to claim 1, wherein said recording head is a thermal printing head.

3. An image recording unit according to claim 1, wherein said transmission gear is disposed on the opposite side of said recording head relative to said recording roller.

4. An image reading and recording apparatus comprising:
   a) a board for receiving information written thereon;
   b) a guide rail extending along one side of said board;
   c) a reading unit movable along said guide rail for reading the information on said board; and
   d) a recording unit for recording a picture signal received from said reading unit, said recording unit being capable of regenerating the information on a reduced scale as a hard copy of said picture signal, wherein said image recording unit comprises:
      i) a fixed unit body,
      ii) a drive unit mounted on said unit body and including a motor and a transmission gear rotatably driven by said motor,
      iii) a recording head mounted on said unit body,
      iv) a closure assembly attached to said unit body and movable relative to said unit body between an open position remote from said body and a closed position united with said body,
      v) a recording roller mounted on said closure assembly and forcing a recording sheet against said recording head when said closure unit is disposed in said closed position, and
      vi) a driven gear fixedly mounted on an end of said recording roller and releasable engaged with said transmission gear for rotating said recording roller when said closure assembly is disposed in said closed position, said transmission gear being disposed in such a position that said driven roller is urged by said transmission gear in a direction as to force said recording roller against said recording head when said transmission gear is rotating.

5. An image reading and recording apparatus according to claim 4, wherein said recording head is a thermal printing head.

6. An image reading and recording apparatus according to claim 4, wherein said transmission gear is disposed on the opposite side of said recording head relative to said recording roller.

* * * * *